United States Patent
Wu et al.

(10) Patent No.: US 7,876,742 B2
(45) Date of Patent: Jan. 25, 2011

(54) MOBILITY SIGNALING USING DIRECT OR INDIRECT SIGNALING BASED ON CELL RESIDENCY HEURISTICS

(75) Inventors: Eric Wu, Singapore (SG); Gregory Ian Daley, Camberwell VIC (AU); Ahmet Sekercioglu, Yarra (AU); Sathya Narayanan, Plainsboro, NJ (US)

(73) Assignee: Panasonic Corporation, Osaka (JP)

( * ) Notice: Subject to any disclaimer, the term of this patent is extended or adjusted under 35 U.S.C. 154(b) by 517 days.

(21) Appl. No.: 11/814,760

(22) PCT Filed: Jan. 9, 2006

(86) PCT No.: PCT/US2006/000535

§ 371 (c)(1),
(2), (4) Date: Jul. 25, 2007

(87) PCT Pub. No.: WO2006/083489

PCT Pub. Date: Aug. 10, 2006

(65) Prior Publication Data

US 2008/0013493 A1    Jan. 17, 2008

(51) Int. Cl.
*H04L 12/28* (2006.01)
(52) U.S. Cl. ............................................. 370/351
(58) Field of Classification Search .............. 370/351
See application file for complete search history.

(56) References Cited

U.S. PATENT DOCUMENTS 6,697,340 B2 * 2/2004 Christie et al. ............ 370/259
7,085,576 B2 * 8/2006 Ranganathan ............. 455/456.1
2003/0095523 A1 5/2003 Korus et al.
2008/0013493 A1 * 1/2008 Wu et al. ..................... 370/331

OTHER PUBLICATIONS

Pramil A. D et al., "TCP performance enhancement over mobile IPv6: Innovative Fragmenttation Avoidance and Adaptive Routing Techniques", IEE Proceedings : Communications, Institution of Electrical Engineers, GB, vol. 151, No. 4, Jul. 7, 2004, pp. 337-346, XP006022322 ISSN:1350-2425.
Nikander P. et al., Mobile IP version 6 (MIPv6) Route Optimization Security Design Vehicular Technology Conference, 2003. vtc 2003-fall., 2003 IEEE 58th Orlando, Fl, USA Oct. 6-9, 2003, Piscataway, NJ, USA, IEEE, US, Oct. 6, 2003, pp. 2004-2008, XP010702064 ISBN: 0-7803-7954-3, p. 2006-2007.
International Search Report Apr. 26, 2006.

* cited by examiner

*Primary Examiner*—Daniel Wu
*Assistant Examiner*—Frederick Ott
(74) *Attorney, Agent, or Firm*—RatnerPrestia

(57) ABSTRACT

A mobility signaling method and apparatus are disclosed. Mobility signaling is performed by, first, generating a mobility signaling message (300, 302) at a mobile node (100) to be sent to a correspondent node (112). Next, either direct signaling or indirect signaling is selected as a signaling mechanism for the mobility signaling message (300, 302) based on a cell residence heuristic. The mobility signaling message (300, 302) is then sent to the correspondent node using the selected signaling mechanism for the mobility signaling message (300, 302).

24 Claims, 7 Drawing Sheets

MOBILITY SIGNALING USING DIRECT OR INDIRECT SIGNALING BASED ON CELL RESIDENCY HEURISTICS

FIELD OF THE INVENTION

The present invention relates to mobility management schemes for use with network communication systems and, more particularly, to mobility signaling methods for use in such systems.

BACKGROUND OF THE INVENTION

Mobility management schemes provide home/host and location mapping for mobile devices (herein mobile nodes) that connect to a network, such as a global information network, e.g., the Internet. The network may be made up of, for example, multiple Ethernet segments and wireless LAN cells. The location of a mobile node within the network may change frequently. For example, a mobile node may move within the network between wireless LAN cells or from a wireless LAN cell to an Ethernet segment. Mobility management schemes allow communication with the mobile node regardless of its location. One such scheme is Mobile IPv6. Support for mobile nodes under Mobile IPv6 is described in Internet Request for Comments (RFC) 3775 entitled "Mobility Support in IPv6" (referred to herein as RFC 3775).

A mobile node (MN) is associated with a home address (HADDR). The HADDR represents a home link/connection point to the network through which the MN can be reached regardless of its current point of attachment to the network. While moving about the network, the MN may also be associated with a care-of address (COA). The COA represents a foreign link/connection point to the network through which the MN may be currently reached directly.

The MN registers its COA with a home agent (HA), a router accessible at the home link of the MN. The HA keeps binding information for the MN that includes the HADDR and the COA of the MN. The HA may intercept incoming packets addressed to the HADDR of the MN and forward the intercepted packets to the current location of the MN using the COA of the MN.

A MN may communicate with one or more correspondent nodes (CN), e.g., other MNs. As with the MN, the location of each CN may change frequently. Mobile IPv6 provides means for managing handover situations where both the MN and a CN with which the MN is communicating are mobile, such as when the MN and/or the CN change LAN cells. As part of the handover procedure, binding signaling is performed.

In RFC 3775, binding signaling includes performing a return routability (RR) procedure and a binding update (BU) procedure. The return routability procedure enables the CN to obtain some reasonable assurance that the MN is in fact addressable at its claimed COA as well as at its HADDR. With this assurance, the CN will accept binding updates from the MN that instruct the CN to direct data to the MN at its claimed COA.

The RFC 3775 return routability procedure involves a home test and a care-of test. During the home test, the MN forwards a packet to its HA, the HA for the MN receives and forwards the packet to the CN at its HADDR, and an HA for the CN receives and forwards the packet to the CN at its COA. The CN then responds to the home test through the same path. During the care-of test, the MN transmits a packet to the HADDR of the CN and the HA for the CN receives and forwards the packet to the CN at its COA. The CN then responds to the care-of test through the same path.

An MN that is able to prove it is reachable at both its HADDR and its COA is authorized to perform the BU procedure. During the BU procedure, the MN transmits a packet containing a message to the HADDR of the CN and the HA for the CN receives and forwards the packet to the CN at its COA. The information in this message updates the address binding state of the CN so that it may send packets directly to the MN's COA.

The combination of signaling for the return routability procedure (or an alternative authorization procedure that proves to the CN that the MN is reachable at both the HADDR and the COA of the MN) and signaling for the binding update procedure are termed "mobility signaling" in this document. Such signaling introduces delays in handoff time.

SUMMARY OF THE INVENTION

Various aspects of the present invention are embodied in mobility signaling methods and apparatus. Mobility signaling is performed by, first, generating a mobility signaling message at a mobile node to be sent to a correspondent node. Next, either direct signaling or indirect signaling is selected as a signaling mechanism for the mobility signaling message based on a cell residency heuristic. The mobility signaling message is then sent to the correspondent node using the selected signaling mechanism for the mobility signaling message.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
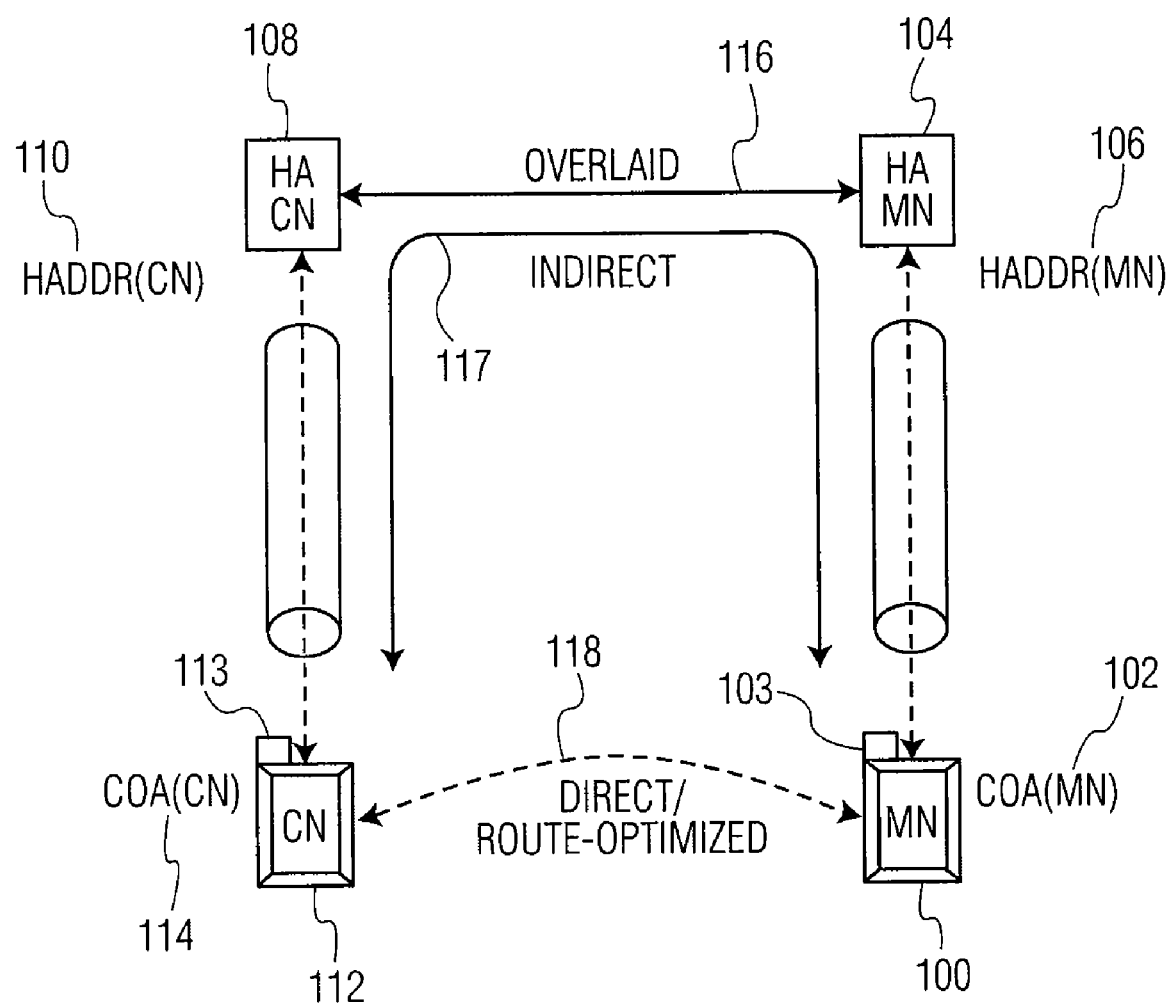
FIG. 1 is a flow diagram illustrating a prior art data transmission scheme for transmitting data packets between a mobile node and a correspondent node.

FIG. 1 depicts a mobile node (MN) 100 in communication with a correspondent node (CN) 112 over a network. The MN 100 is associated with a home address (HADDR) 106 that represents a home link for the MN 100 on the network and may also be associated with a care-of address (COA) 102 that represent a foreign link for the MN 100 on the network when MN 100 is connected to the network at a point other than its home link. Likewise, the CN 112 is associated with a HADDR 110 and may be associated with a COA 114.

A home agent (HA) 104 is associated with the MN 100 and another home agent (HA) 108 is associated with the CN 112. The HA 104 for the MN 100 is a router located at the home link of the MN 100 and the HA 108 for the CN 112 is a router located at the home link of the CN 112. The HA 104 for the MN 100 stores the HADDR 106 and the COA 102 of the MN 100 and the HA 108 for the CN 112 stores the HADDR 110 and the COA 114 of the CN 112. In use, the HA 104 for the MN 100 intercepts messages transmitted to the HADDR 106 of the MN 100 when the MN 100 is away from its home link and transfers the intercepted messages to the MN 100 using the COA 102 of the MN 100. Likewise, the HA 108 for the CN 112 intercepts messages transmitted to the HADDR 110 of the CN 112 when the CN 112 is away from its home link and transfers the intercepted messages to the CN 112 using the COA 114 of the CN 112.

The MN 100 includes a binding cache 103 that may store binding information for one or more correspondent nodes, e.g., the CN 112. In an exemplary embodiment, the binding information includes a HADDR and a COA for each correspondent node with which the MN 100 is in communication. For example, the binding cache 103 of the MN 100 may store the HADDR 110 and the COA 114 of the CN 112. Likewise, the CN 112 includes a binding cache 113 that may store binding information for the MN 100, e.g., the HADDR 106 and the COA 102 of the MN 100.

The MN 100 may communicate with the CN 112 using either an indirect path 117 or a route-optimized/direct path 118. Data packets are routinely sent via the indirect path 117. The MN 100, for example, may send a data packet to the CN 112 indirectly by addressing the packet to the HADDR 110 of the CN 112. In accordance with this example, the data packet from the MN 100 is tunneled to the HA 104 of the MN 100. The data packet next takes an overlaid path 116 between the HA 104 of the MN 100 and the HA 108 of the CN 112. The data packet is then tunneled from the HA 108 of the CN 112 to the CN 112 using the COA 114 of the CN 112.

Similarly, the CN 112 may send a data packet to the MN 100 indirectly by addressing the packet to the HADDR 106 of the MN 100. In accordance with this example, the data packet is tunneled from the CN 112 to the HA 108 of the CN 112. The packet next takes the overlaid path 116 from the HA 108 of the CN 112 to the HA 104 of the MN 100. The packet is then tunneled from the HA 104 of the MN 100 to the MN 100 using the COA 102 of the MN 100.

Data packets may also be sent via the direct path 118. Typically, the packets may be sent via the direct path 118 in accordance with a route-optimization procedure. A data packet being sent directly from MN 100 to CN 112 uses the COA 114 of the CN 112. The data packet may thus be sent directly from the MN 100 to the CN 112, thereby bypassing the HA 104 of the MN 100 and the HA 108 of the CN 112. Similarly, a data packet sent from the CN 112 to the MN 100 using the direct path 117 uses the COA 102 of the MN 100 to send the packet directly from the CN 112 to the MN 100, thereby bypassing the HAs 104 and 108.

Route-optimization reduces the delay for transferring packets between the MN 100 and the CN 112 by reducing per-packet overhead, thereby reducing transmission latencies. In order to utilize route-optimization, the MN 100 typically updates the CNs, e.g., the CN 112, with its binding information (e.g., the HADDR 106 and the COA 102 of the MN 100), and vice versa. In addition, the MN and the CNs typically continue to provide binding information (e.g., its HADDR and COA) through binding updates each time they change cells.

Mobility signaling is performed prior to establishing route-optimization. In Mobile IPv6, the mobility signaling includes a return routability procedure and a binding update procedure that are performed before route-optimization may be established. Although mobility signaling is described below with reference to Mobile IPv6, this is to facilitate description and one of skill in the art will recognize that the scope of the present invention encompasses other types of mobility signaling schemes.

The return routability procedure is performed prior to the binding update procedure. During the return routability procedure the CN 112 is assured (e.g., through authentication) that the MN 100 is authorized to use the HADDR 106 and the COA 102 of the MN 100. During the binding update procedure, the MN 100 provides the CN 112 with its binding information (e.g., the HADDR 106 and the COA 102 of the MN 100), which the CN 112 stores in its binding cache 113 for use during subsequent data packet transmissions. Similarly, the MN 100 is assured that the CN 112 is authorized to use the HADDR 110 and the COA 114 of the CN 112 using the return routability procedure. The CN 112 then provides the MN 100 with its binding information (e.g., the HADDR 110 and the COA 114 of the CN 112) using the binding update procedure, which the MN 100 stores in its binding cache 103 for use during subsequent data packet transmissions.

Although Mobile IPv6 allows route-optimized data transmission, it requires that mobility signaling initiated by the MN 100 use the HADDR 110 of the CN 112 (and, thus, the HA 108 of the CN 112). Likewise, Mobile IPv6 requires that mobility signaling initiated by the CN 112 use the HADDR 106 of the MN 100 (and, thus, the HA 104 of the MN 100). Accordingly, all mobility signaling for MN initiated signaling must be routed to the CN 112 via the HA 108 of the CN 112 and all mobility signaling for CN initiated signaling must be routed to the MN 100 via the HA 104 of the MN 100.

Figure 2:
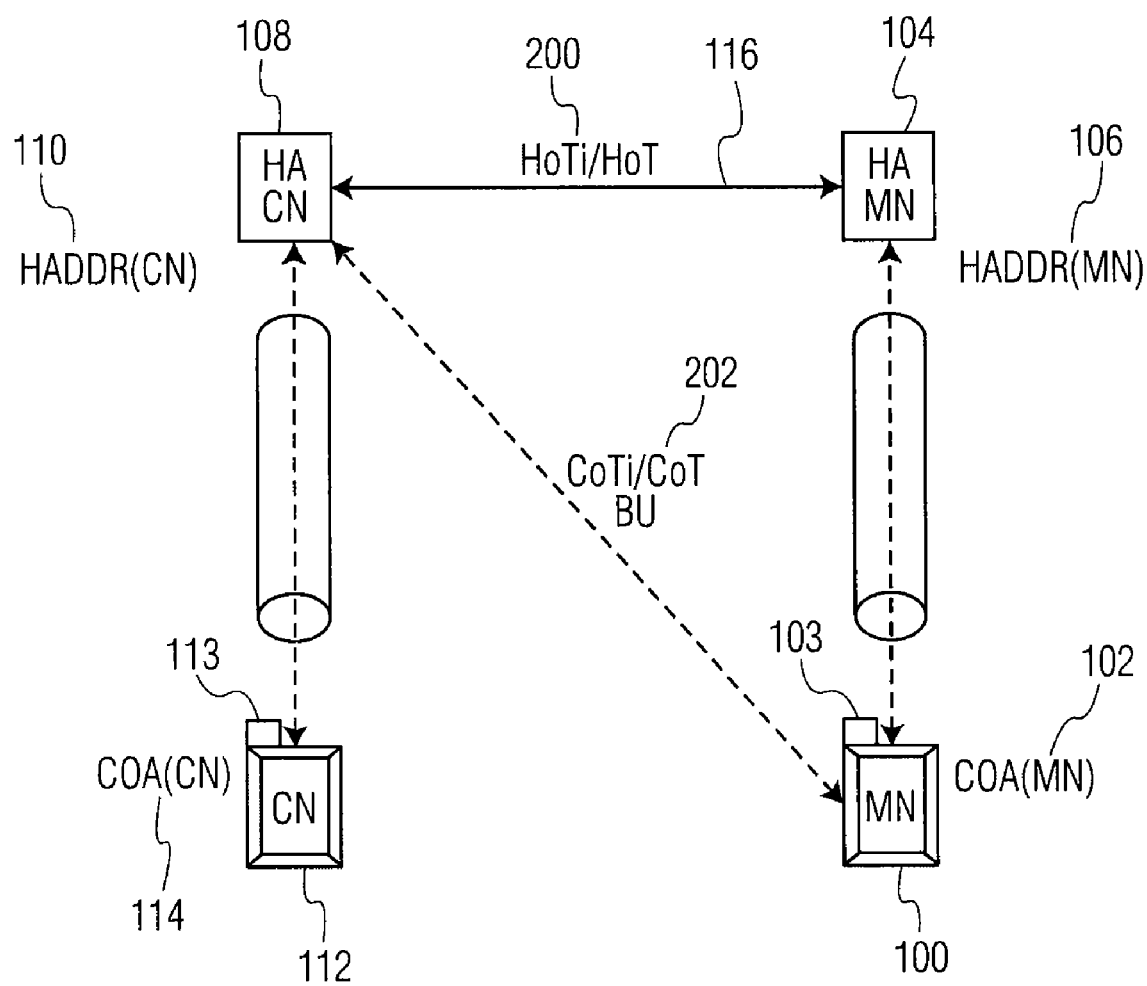
FIG. 2 is a flow diagram illustrating a prior art mobility signaling scheme.
Figure 3:
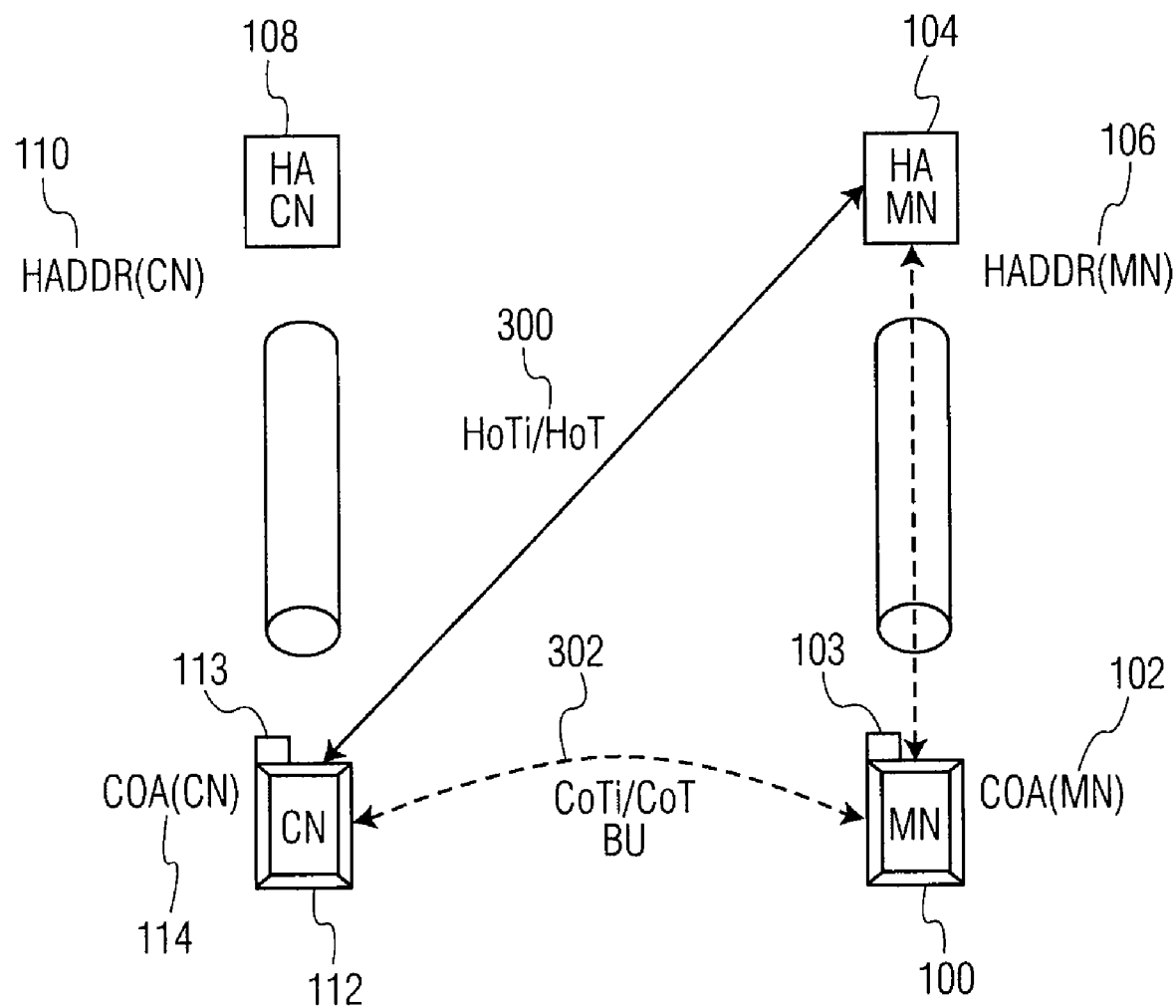
FIG. 3 is a flow diagram illustration a mobility signaling scheme in accordance with an aspect of the present invention.

FIGS. 2 and 3 are used to describe the return routability procedure and the binding update procedure between the MN 100 and the CN 112 for conventional mobility signaling and for exemplary mobility signaling in accordance with an aspect of the present invention, respectively. The return routability procedure includes a Home Test Initiate (HoTi) message, a Home Test (HoT) message, a Care-of Test Initiate (CoTi) message, and a Care-of Test (CoT) message. For example, in a return routability procedure initiated by the MN 100, the MN 100 sends HoTi and CoTi messages to the CN 112. In response, the CN 112 sends a Home Test (HoT) message and a Care-of Test (CoT) message to the MN 100. After successfully completing/satisfying the return routability procedure, the MN 100 generates a binding update (BU) message with an authentication key generated from key-tokens present in the HoT and CoT messages (which includes the HAADR 106 and the COA 102 of the MN 100) and sends the BU message to the CN 112, which updates its binding cache 113 with the HAADR 106 and the COA 102 of the MN 100. Similar signaling occurs for a return routability procedure initiated by the CN 112.

In FIG. 2, in accordance with the conventional signaling protocol of Mobile IPv6, all mobility signaling messages are routed using an indirect signaling mechanism between the MN 100 and the CN 112 via the HA 108 for the CN 112 for mobility signaling initiated by the MN 100. For example, the HoTi message is transferred from the MN 100 through both of the HAs 104/108 to the CN 112 (with the HoT message being returned along the same path) and the CoTi and BU messages are transferred from the MN 100 to the CN 112 through the HA 108 (with the CoT message being returned along the same path). Thus, all mobility signaling messages for mobility signaling initiated by the MN 100 travel through the HA 108 of the CN 112, which introduces delay to the mobility signaling. Similarly, all mobility signaling messages for mobility signaling initiated by the CN 112 travel through the HA 104 of the MN 100, which also introduces delay to the mobility signaling.

In FIG. 3, in accordance with an exemplary aspect of the present invention, all mobility signaling messages are routed using a direct signaling mechanism between the MN 100 and the CN 112 for mobility signaling initiated by the MN 100. For example, the HoTi message is transferred from the MN 100 through only the HA 104 of the MN 100 (as opposed to both of the HAs 104/108 for indirect signaling mechanisms) and then directly to the CN 112 (with the HoT message being returned along the same path) and the CoTi/BU messages are transferred from the MN 100 directly to the CN 112 without passing through either of the HA 104/108 (with the CoT message being returned along the same path). Thus, all mobility signaling messages for mobility signaling initiated by the MN 100 bypass the HA 108 for the CN 112, thereby removing delay from the mobility signaling. Similarly, all mobility signaling messages for mobility signaling initiated by the CN 112 bypass the HA 104 for the MN 100, thereby also removing delay from the mobility signaling.

Figure 4A:
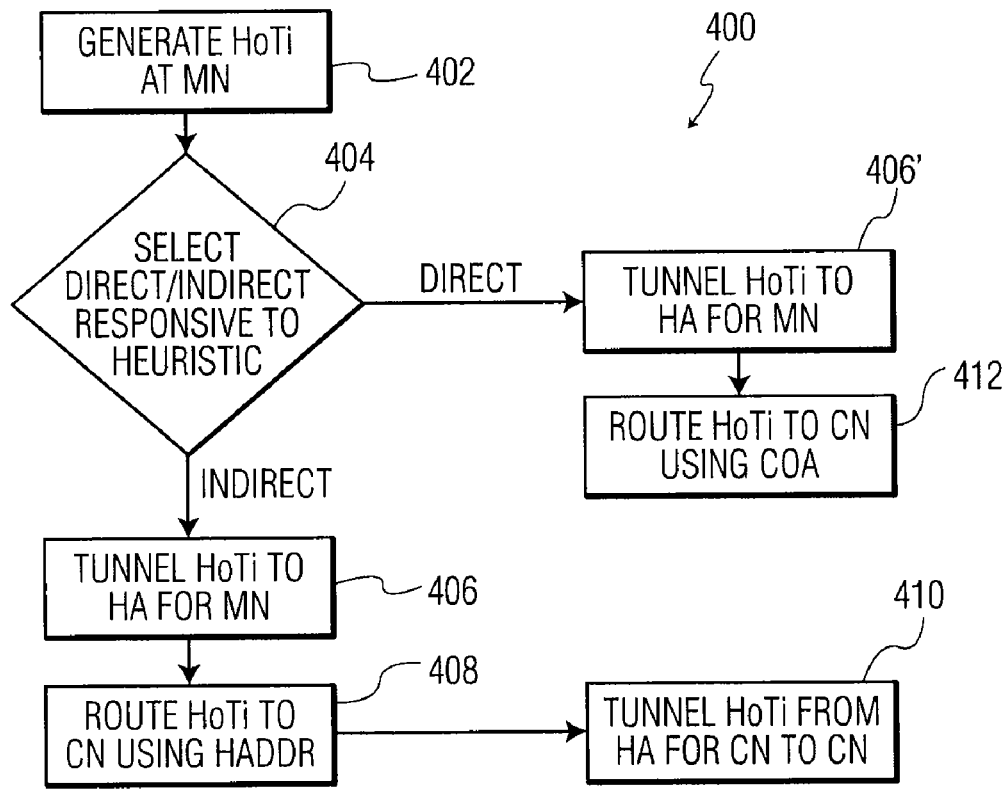
FIG. 4A is a flowchart of exemplary steps for performing home test mobility signaling in accordance with an aspect of the present invention.
Figure 4B:
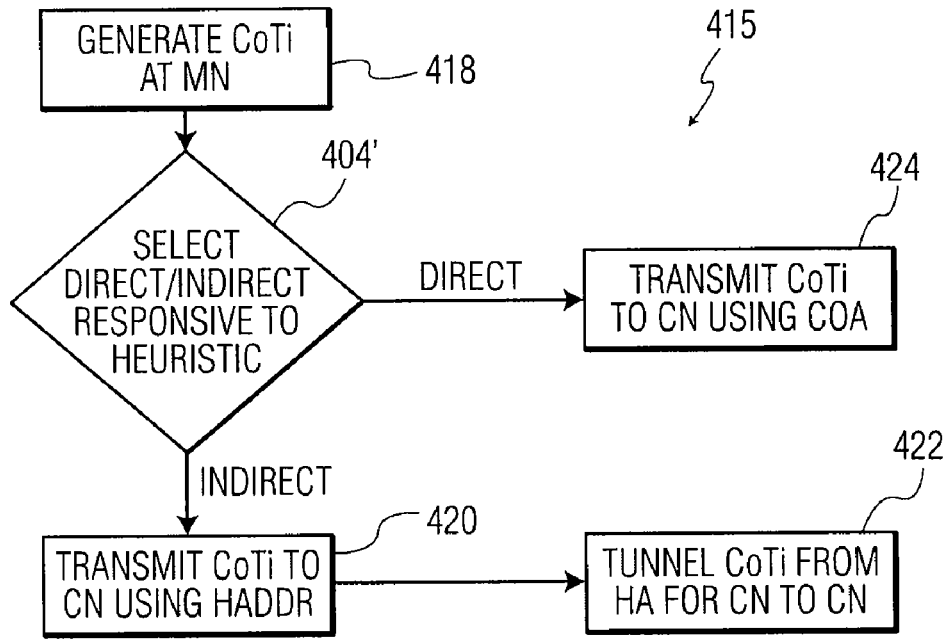
FIG. 4B is a flowchart of exemplary steps for performing care-of test mobility signaling in accordance with an aspect of the present invention.
Figure 4C:
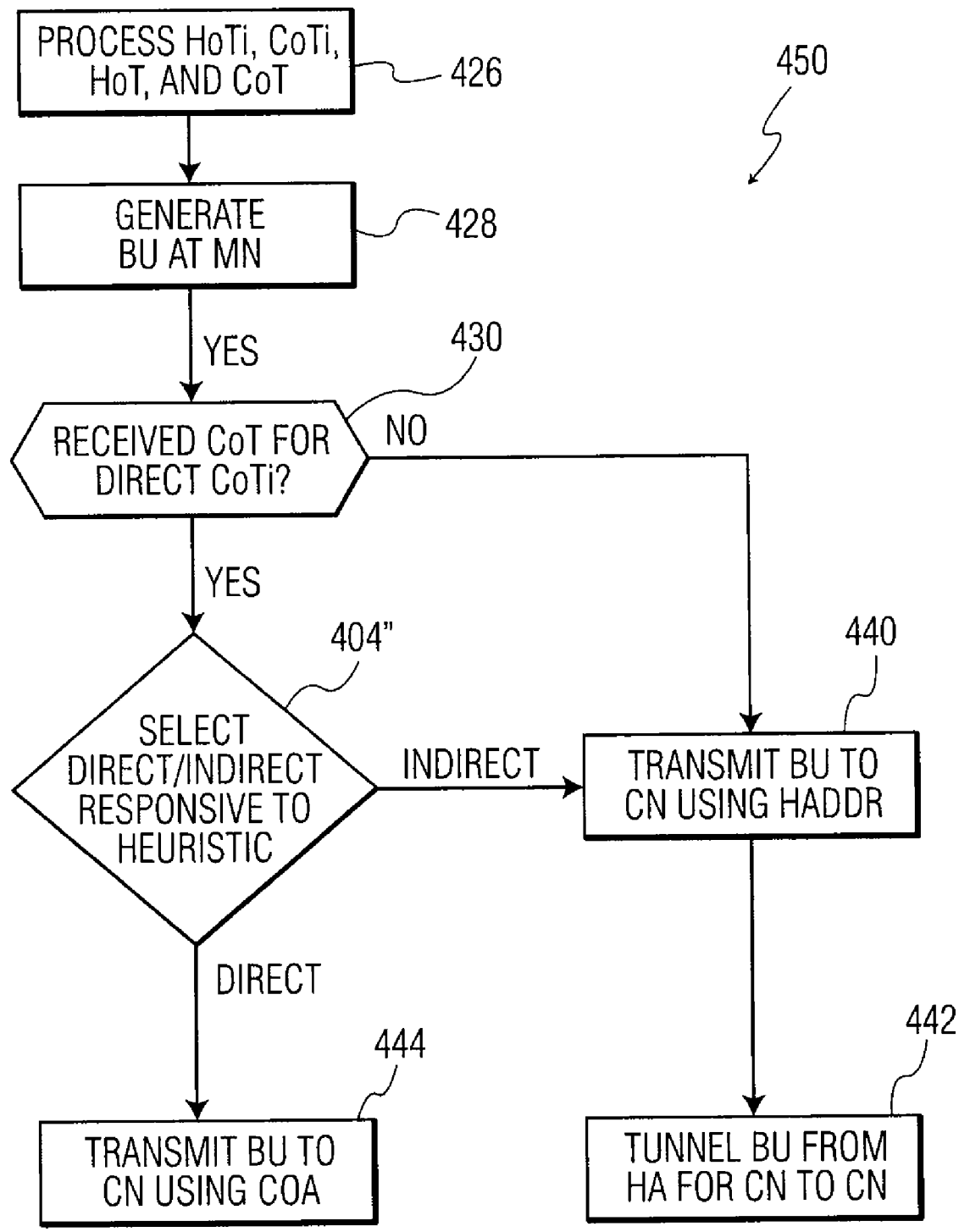
FIG. 4C is a flowchart of exemplary steps for performing binding update mobility signaling in accordance with an aspect of the present invention.

FIGS. 4A through 4C depict flow charts of exemplary mobility signaling steps in accordance with aspects of the present invention. The exemplary steps are described below with reference to FIGS. 2 and 3.

FIG. 4A depicts a flow chart 400 of exemplary steps for sending a HoTi message from a MN 100 to a CN 112 during a return routability procedure according to an aspect of the present invention. At block 402, the MN 100 generates the HoTi message, which includes the HADDR 106 of the MN 100.

At block 404, in accordance with an exemplary embodiment, the MN 100 selects an indirect signaling mechanism (see FIG. 2) or a direct signaling mechanism (see FIG. 3) as the signaling mechanism for the HoTi message. In an exemplary embodiment, the selection of the signaling mechanism is based on a cell residency heuristic, which is described in detail below. If the heuristic indicates indirect signaling, processing proceeds at block 408 after the HoTi is tunneled to the HA 104 for the MN 100 with the HADDR 110 of the CN 112 as the destination at block 406. Otherwise, if the heuristic indicates direct signaling, processing proceeds at block 412 after the HoTi is tunneled to the HA 104 for the MN 100 with the COA 114 of the CN 112 as the destination at block 406'.

At block 408, the HA 104 for the MN 100 routes the HoTi message to the HADDR 110 of the CN 112 where it is intercepted by the HA 108 for the CN 112. Then, at block 410, the HA 108 for the CN 112 tunnels the HoTi message to the CN 112 using the COA 114 of the CN 112. Thus, the HoTi message passes through the HA 108 for the CN 112, which introduces delay as the HoTi message travels from the MN 100 to the CN 112.

At block 412, the HA 104 routes the HoTi message directly to the CN 112 using the COA 114 of the CN 112. Thus, the HoTi message bypasses the HA 108 for the CN 112, which eliminates the delay that would be introduced to the HoTi message as it travels from the MN 100 to the CN 112 using an indirect signaling mechanism.

Although not shown, a HoT message from the CN 112 that is generated in response to receipt of the HoTi message from the MN 100 may travel from the CN 112 to the MN 100 using the same signaling mechanism selected in step 404. Alternatively, the same (or a different heuristic) may be applied by the CN 112 and/or HA 108 in determining whether the HoT message should use the indirect signaling mechanism or the direct signaling mechanism.

FIG. 4B depicts a flow chart 415 of exemplary steps for sending a CoTi message from a MN 100 to a CN 112 during a return routability procedure according to an aspect of the present invention. At block 418, the MN 100 generates the CoTi message, which includes the COA 102 of the MN 100. At block 404', the MN 100 selects an indirect signaling mechanism (see FIG. 2) or a direct signaling mechanism (see FIG. 3) as the signaling mechanism for the CoTi message. In an exemplary embodiment, the selection of the signaling mechanism is based on a cell residency heuristic, which is described in detail below. If the heuristic indicates indirect signaling, processing proceeds at block 420. Otherwise, if the heuristic indicates direct signaling, processing proceeds at block 424.

At block 420, the MN 100 transmits the CoTi message to the HADDR 110 of the CN 112 where it is intercepted by the HA 108 for the CN 112. Then, at block 422, the HA 108 for the CN 112 tunnels the CoTi message to the CN 112 using the COA 114 of the CN 112. Thus, the CoTi message passes through the HA 108 for the CN 112, which introduces delay as the CoTi message travels from the MN 100 to the CN 112.

At block 424, the MN 100 transmits the CoTi message directly to the CN 112 using the COA 114 of the CN 112. Thus, the CoTi message bypasses the HA 108 for the CN 112, which eliminates the delay that would be introduced to the CoTi message as it travels from the MN 100 to the CN 112 using an indirect signaling mechanism.

Although not shown, a CoT message from the CN 112 that is generated in response to receipt of the HoTi message from the MN 100 may travel from the CN 112 to the MN 100 using the same signaling mechanism selected in step 404', e.g., based on a cell residency heuristic. Alternatively, the same (or a different heuristic) may be applied by the CN 112 in determining whether the CoT message should use the indirect signaling mechanism or the direct signaling mechanism.

FIG. 4C depicts a flow chart 450 of exemplary steps for sending a binding update (BU) message from a MN 100 to a CN 112 during a binding update procedure according to an aspect of the present invention. In an exemplary embodiment, the binding update procedure is performed after the HoT message and the CoT message, which are responsive to the HoTi message and the CoTi message, respectively, are received by the MN 100 in accordance with the return routability procedure.

At block 426, the MN 100 processes the HoTi, HoT, CoTi, and CoT messages for a return routability procedure initiated by the MN 100. At block 428, the MN 100 generates a binding update (BU) message based at least in part on information obtained from processing the HoTi, HoT, CoTi, and CoT messages.

At block 430, a decision is made regarding the CoTi and CoT messages. If the CoT message was received in response to a CoTi message that was transmitted from the MN 100 to the CN 112 using a direct signaling mechanism (rather than an indirect signaling mechanism), processing proceeds at block 404". Otherwise, processing proceeds at block 440.

At block 404", the MN 100 selects an indirect signaling mechanism (see FIG. 2) or a direct signaling mechanism (see FIG. 3) as the signaling mechanism for the BU message. In an exemplary embodiment, the selection of the signaling mechanism is based on a cell residency heuristic, which is described in detail below. If the heuristic indicates indirect signaling, processing proceeds at block 440. Otherwise, if the heuristic indicates direct signaling, processing proceeds at block 444.

At block 440, the MN 100 transmits the BU message to the HADDR 110 of the CN 112 where it is intercepted by the HA 108 for the CN 112. Then, at block 442, the HA 108 for the CN 112 tunnels the BU message to the CN 112 using the COA 114 of the CN 112. Thus, the BU message passes through the HA 108 for the CN 112, which introduces delay as the BU message travels from the MN 100 to the CN 112.

At block 444, the MN 100 transmits the BU message directly to the CN 112 using the COA 114 of the CN 112. Thus, the BU message bypasses the HA 108 for the CN 112, which eliminates the delay that would be introduced to the BU message as it travels from the MN 100 to the CN 112 using an indirect signaling mechanism.

Figure 5:
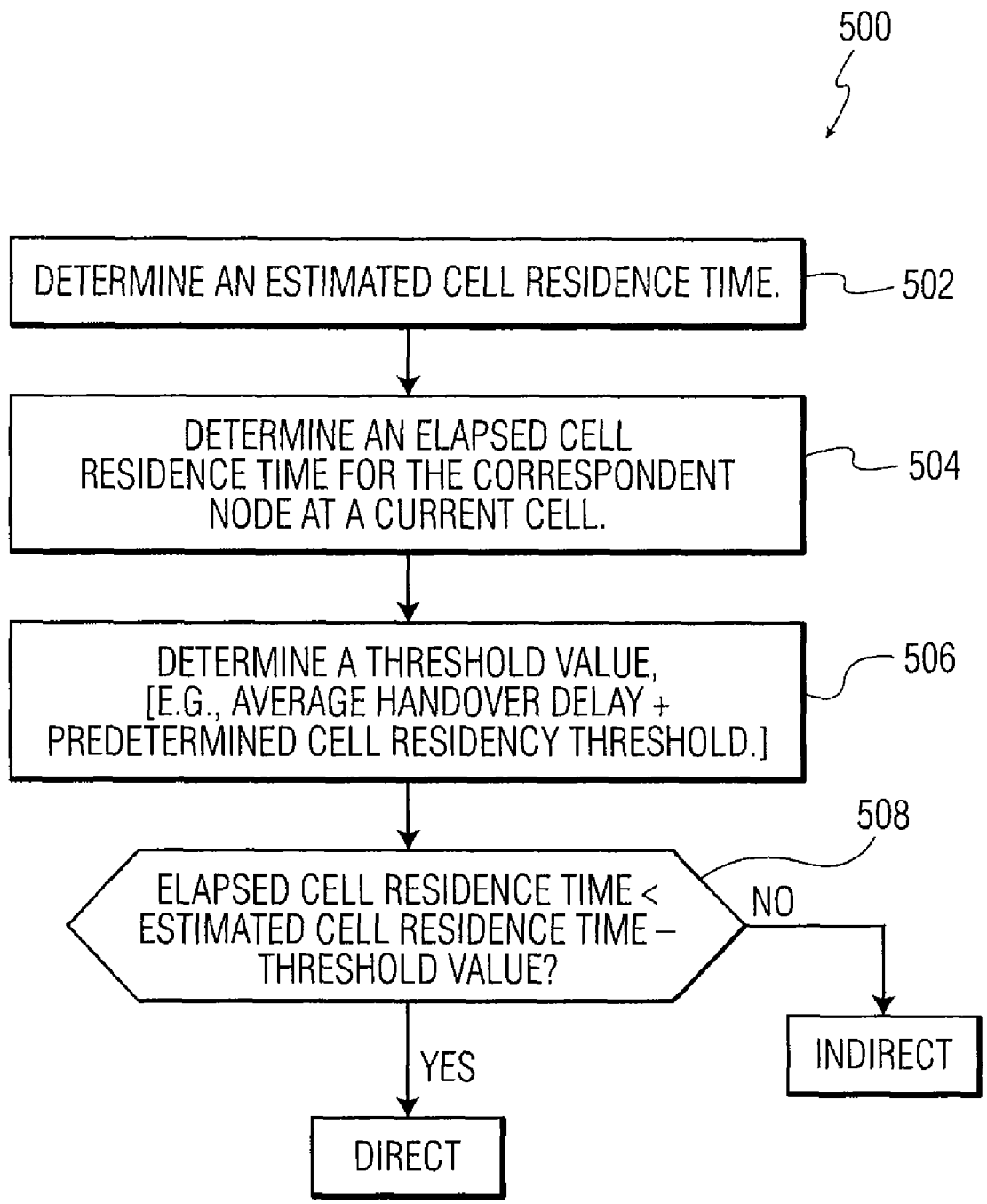
FIG. 5 is a flowchart of exemplary steps for selecting indirect/direct mobility signaling using an exemplary heuristic in accordance with an aspect of the present invention.

FIG. 5 depicts a flow chart 500 of exemplary steps for selecting either an indirect signaling mechanism or a direct signaling mechanism based on an exemplary heuristic, e.g., steps 404, 404', and 404" of FIGS. 4A, 4B, and 4C, respectively. In an exemplary embodiment, the heuristic is based on an estimated cell residence time of the CN 112 (e.g., the amount of the time the CN 112 is likely to remain attached to the current cell), which is discussed below with reference to FIG. 6. Using the estimated cell residence time, the exemplary heuristic measure desirably calculates whether it is likely that the CN 112 is going to leave its current cell before an operation associated with a mobility signaling message operation reaches the CN 112 (e.g., a return routability procedure or binding update message from the MN 100). If it is determined that the CN 112 is unlikely to move to another cell during the transmission of a message by the MN 100 (e.g., HoTi, CoTi, or BU messages) and, optionally, a corresponding reply message (e.g., HoT and Cot messages), the HA 108 for the CN 112 may desirably be bypassed completely, thus a direct signaling mechanism is employed. Otherwise an indirect signaling mechanism may be employed.

At block 502, the MN 100 determines an estimated cell residence time for the CN 112. The estimated cell residence time represents the amount of time the CN 112 is likely to remain at any given cell. Exemplary methods for determining the estimated cell residence time are described below.

At block 504, the MN 100 determines an elapsed cell residence time for the CN 112 at a current cell. In an exemplary embodiment, the elapsed cell residence time is determined by calculating the difference between a current time and a time corresponding to the receipt of the last binding update from the CN 112.

At block 506, the MN 100 determines a threshold value for mobility signaling with the CN 112. In an exemplary embodiment, the threshold value is based on a determined value and a predetermined value. For example, the threshold value may be the sum of a calculated average handover delay and a predetermined cell residency threshold, e.g., 0.1 seconds to 10 seconds. The calculation of an average handover delay will be understood by one of ordinary skill in the art. In alternative exemplary embodiments, the threshold value may be based solely on determined or predetermined values.

At block 508, a decision is made regarding the likelihood that the CN 112 will remain attached to its current cell until a mobility signaling message operation is complete. If it is determined that the CN 112 will likely remain attached to its current node, the direct signaling mechanism is selected. Alternatively, if it is determined that the CN 112 will likely not remain attached to its current node, the indirect signaling mechanism is selected. Additionally, if a mobility signaling message operation fails, e.g., due to problems with the wireless channel, the MN 100 may select the indirect signaling mechanism for retransmission.

In an exemplary embodiment, it will be determined that the CN 112 will likely remain attached to its current node if the elapsed cell residence time is less than about (e.g., less than/ less than or equal to) the estimated cell residence time minus a threshold value. In accordance with this embodiment, it will be determined that the CN 112 will likely not remain attached to its current node if the elapsed cell residence time is greater than about (e.g., greater than or equal to/greater than) the estimated cell residence time minus a threshold value.

Figure 6:
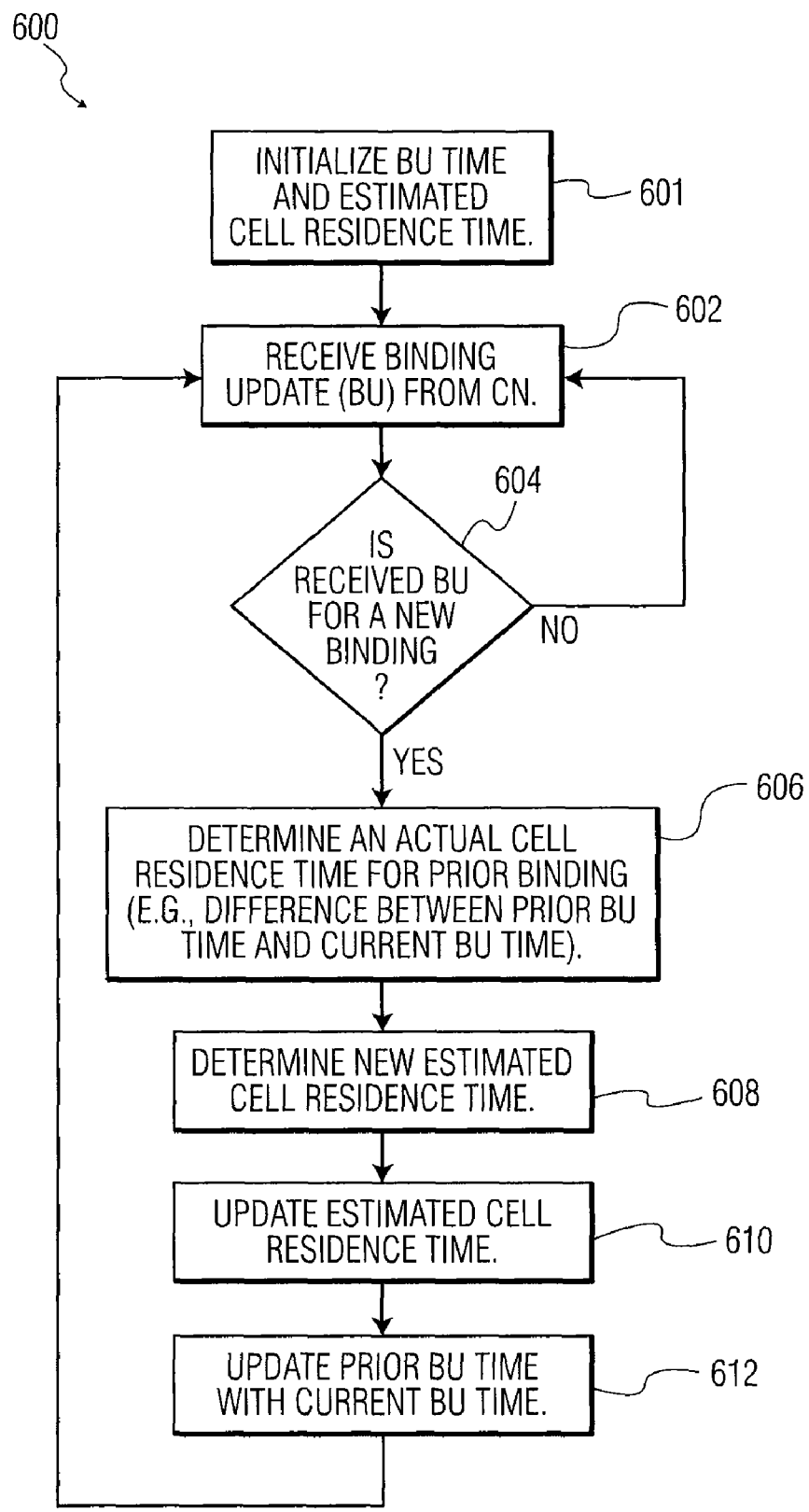
FIG. 6 is a flowchart of exemplary steps for estimating a cell residence time in accordance with an aspect of the present invention.

FIG. 6 depicts a flow chart 600 of exemplary steps to determine an estimated cell residence time. At block 600, a prior actual BU time parameter for a binding update message received by the MN 100 from the CN 112 and an estimated cell residence time parameter are initialized. These values may be actual parameters if the system has been running for a sufficient time to have actual values generated, or they may be initial estimates if the system is just being initiated.

At block 602, the MN 100 receives a binding update message from the CN 112. At block 604, the received BU message is compared against a prior BU message to determine if it is for a new binding having a new COA, indicating that the CN 112 has changed cells. If the BU message is not for a new binding, the process returns to step 602 and waits for the next BU. Otherwise, processing proceeds at block 606. It will be understood by one of skill in the art that if BU messages are sent only when the CN 112 changes cells, the step of block 604 may be omitted.

At block 606, the MN 100 determines an actual cell residence time that represents the amount of time the CN 112 was at a previous residence/cell. In an exemplary embodiment, the actual cell residence time is determined by calculating the difference between a previous BU time of a previous binding update message and a current BU time for a successive binding update message.

At block 608, a new estimated cell residence time is determined. In an exemplary embodiment, the estimated cell residence time is determined by averaging the actual cell residence time determined at block 606 and one or more previously determined actual cell residence times. In another exemplary embodiment, a running average cell residence time is maintained by averaging the actual prior cell residence time with a previously calculated average. This average may be a weighted average, for example, to reduce/increase the relative contribution of the actual prior cell residence time to the average, e.g., the actual prior cell residence time may receive a weight of 0.3 while the current average value receives a weight of 0.7.

At block 610, the estimated cell residence time parameter is updated using the new estimated cell residence time determined in the step of block 608. At block 612, the prior BU time is updated with the current BU time. The process returns to step 602 to wait for the next binding update message from the CN 112.

In addition to the estimated cell residence time, an exemplary heuristic may use factors such as the delay for message signaling. For example, the exemplary heuristic may determine a total delay for HoTi/HoT and CoTi/CoT messaging when using either direct or indirect message signaling. The signaling may be comprised of a series of relayed messages passed between one of the four network entities: CN 112, MN 100 or either of their HAs 108/104. RTT is the round trip time, e.g. for the HoTi/HoT pair or the CoTi/CoT pair. The maximum duration of either the home and care-of tests may be added to the subsequent binding signaling passing to the CN, which is relayed by the HA 104 for the CN 108.

For example, equation (1) represents the total delay for an indirect signaling exchange, $D^{indirect}$, between a MN 100 and its peer CN 112.

$$D^{indirect} = \max(RTT_{MN-HA_{MN}} + RTT_{HA_{MN}-HA_{CN}} + \quad (1)$$
$$RTT_{HA_{CN}-CN}, RTT_{MN-HA_{CN}} + RTT_{HA_{CN}-CN}) +$$
$$T_{MN \to HA_{CN}} + T_{HA_{CN} \to CN}$$

The first line represents the total HoTi/HoT messaging time in which a round trip time (RTT) for the HoTi message to transfer from the MN 100 to the HA 104 for the MN 100 and the HoT message to transfer from the HA 104 for the MN 100 to the MN 100, a RTT for the HoTi message to transfer from the HA 104 to the HA 108 for the CN 112 and the HoT message to transfer from the HA 108 to the HA 104, and a RTT for the HoTi message to transfer from the HA 108 to the CN 112 and the HoT message to transfer from the CN 112 to the HA 108 are combined. The second line represent the total CoTi/CoT messaging time in which a round trip time (RTT) for the CoTi message to transfer from the MN 100 to the HA 108 for the CN 112 and the CoT message to transfer from the HA 108 to the MN 100 and a RTT for the CoTi message to transfer from the HA 108 to the CN 112 and the CoT message to transfer from the CN 112 to the HA 108 are combined. The third line represents the subsequent binding signaling to the CN 112 in which the time for the binding message to transfer from the MN 100 to the HA 108 for the CN 112 and the time for the binding message to transfer from the HA 108 to the CN 112 are combined.

Equation (2) represents the total delay for a direct signaling exchange, $D^{direct}$, between a MN 100 and its peer CN 112.

$$D^{direct} = \max(RTT_{MN-HA_{MN}} + RTT_{HA_{MN}-CN}, RTT_{MN-CN}) + \quad (2)$$
$$T_{MN \to CN}$$

The first line represents the total HoTi/HoT messaging time in which a RTT for the HoTi message to transfer from the MN 100 to the HA 104 for the MN 100 and the HoT message to transfer from the HA 104 for the MN 100 to the MN 100 and a RTT for the HoTi message to transfer directly from the HA 104 to the CN 112 and the HoT message to transfer directly from the CN 112 to the HA 104 are combined. The second line represent the total CoTi/CoT messaging time in which a round trip time (RTT) for the CoTi message to transfer directly from the MN 100 to the CN 112 and the CoT message to transfer directly from the CN 112 to the MN 100. The third line represents the subsequent binding signaling to the CN 112 in which the time for the binding message to transfer directly from the MN 100 to the CN 112 is determined.

If either the MN 100 or CN 112 is distant from its HA, it may be desirable to bypass the HA 108 of the CN 112. If signaling latencies are important, such as when signaling is on the critical path of service restoration after movement, there may be a significant improvement in signaling delay if direct signaling is used.

Exemplary heuristics may further determine a probability of signaling loss, for example, by using a geometric relationship between a CN moving at some speed at some radius within a cell. The CN's position may be estimated using the distance the CN may travel, at a speed, to determine the likelihood of the CN moving to another cell. Signaling loss probabilities may be determined for the indirect signaling and direct signaling using geometric relationships.

Although the exemplary heuristic measure has been shown to include using an estimated cell residence time, messaging delay and a probability of signaling loss, it is contemplated that other measures may be used within the heuristic measure without limiting the scope of the invention. For example, exemplary estimated cell residence time may use a probability distribution, such as a Gaussian distribution, or a weighted probability to determine the probability of a signaling loss. The estimated cell residence may be adaptively tracked and updated from prior binding information to better predict the CN's estimated cell residence time. Information such as service restoration requests may also be incorporated into the heuristic measure.

There are trade-offs for using direct and indirect signaling. A cost for direct signaling may include, for example, a higher likelihood of a message becoming lost and, thus, forcing a timeout and resend. A cost of indirect signaling, for example, may include a delay caused by the longer indirect route rather than the direct route. Other factors may be included in the indirect or direct costs without limiting the scope of the present invention. According to a method embodied in the present invention, a signaling mechanism may be chosen by a heuristic measure to reduce the delay of signaling between the MN and CN while maintaining packet loss below an acceptable level. Thus, the delay involved in the return routability procedure may be reduced while maintaining acceptable packet loss rates.

Although the invention has been described as a method, it is contemplated that one or more of the above-described component, functions, and/or steps may be implemented through a software program that controls a computer. The software program may be embodied in a computer-readable carrier such as an integrated circuit, a memory card, a magnetic or optical disk or an audio-frequency, radio-frequency or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A mobility signaling method comprising the steps of:
   generating, at a mobile node, a mobility signaling message to be sent to a correspondent node;
   selecting either direct signaling or indirect signaling as a signaling mechanism for the mobility signaling message based on a cell residency heuristic; and
   sending the mobility signaling message to the correspondent node using the selected signaling mechanism for the mobility signaling message prior to establishing route-optimization between the mobile node and the correspondent node.

2. A mobility signaling method comprising the steps of:
   generating, at a mobile node, a mobility signaling message to be sent to a correspondent node;
   determining an estimated cell residence time for the correspondent node;
   determining an elapsed cell residence time for the correspondent node at a current cell;
   estimating if the correspondent node will remain at the current cell until an operation associated with the mobility signaling message is complete based at least in part on the estimated cell residence time and the elapsed cell residence time;

selecting the direct signaling mechanism if the correspondent node is estimated to remain at the current cell and selecting the indirect signaling mechanism if the correspondent node is estimated to not remain at the current cell; and sending the mobility signaling message to the correspondent node using the selected signaling mechanism for the mobility signaling message.

3. The method of claim 2, wherein the step of estimating if the correspondent node will remain at the current cell is further based on a threshold value and wherein the correspondent node is estimated to remain at the current cell if the elapsed cell residence time is less than the estimated cell residence time minus the threshold value and the correspondent node is estimated to not remain at the current cell if the elapsed cell residence time is greater than the estimated cell residence time minus the threshold value.

4. The method of claim 2, wherein the estimated cell residence time is determined by averaging a plurality of previous actual cell residence times.

5. The method of claim 4, wherein each actual cell residence time is determined by calculating a difference between successive binding update messages received from the correspondent node.

6. The method of claim 4, wherein the estimated cell residence time is further determined by weighting one or more of the previous actual cell residence times.

7. The method of claim 2, wherein the estimated cell residence time is determined by calculating an average of an actual prior cell residence time with a previously calculated average.

8. The method of claim 7, wherein the estimated cell residence time is further determined by weighting at least one of the actual prior cell residence time or the previously calculated average.

9. The method of claim 1, wherein the correspondent node has a home address and a care-of address and wherein the sending step comprises the step of sending the mobility signaling message to the care-of address of the correspondent node when the direct signaling mechanism is selected as the signaling mechanism.

10. The method of claim 9, wherein the sending step comprises the step of sending the mobility signaling message to the home address of the correspondent node when the indirect signaling mechanism is selected as the signaling mechanism.

11. The method of claim 1, wherein the mobility message is a home test init (HoTi) message and wherein the sending step comprises the steps of:

for the indirect signaling mechanism:
tunneling the HoTi message to a home agent of the mobile node; routing the HoTi message from the home agent to an other home agent of the mobile node; and
tunneling the HoTi message from the other home agent to the correspondent node; and for the direct signaling mechanism:
tunneling the HoTi message to the home agent of the mobile node; and
routing the HoTi message directly from the home agent to the correspondent node.

12. The method of claim 1, wherein the mobility message is a care-of init (CoTi) message and wherein the sending step comprises the steps of:

for the indirect signaling mechanism: transmitting the CoTi message from the mobile node to a home agent of the correspondent node; and
tunneling the CoTi message from the home agent to the correspondent node; and for the direct signaling mechanism:
transmitting the CoTi message from the mobile node directly to the correspondent node.

13. The method of claim 1, wherein the mobility message is a binding update (BU) message and wherein the sending step comprises the steps of:

for the indirect signaling mechanism:
transmitting the BU message from the mobile node to a home agent of the correspondent node; and
tunneling the BU message from the home agent to the correspondent node; and for the direct signaling mechanism:
transmitting the BU message from the mobile node directly to the correspondent node.

14. The method of claim 1, wherein the cell residency heuristic determines at least one of (a) a probability of signaling loss or (b) a geometric relationship of the correspondent node within a cell.

15. A mobility signaling apparatus comprising:

means for generating, at a mobile node, a mobility signaling message to be sent to a correspondent node;
means for selecting either direct signaling or indirect signaling as a signaling mechanism for the mobility signaling message based on a cell residency heuristic; and
means for sending the mobility signaling message to the correspondent node using the selected signaling mechanism for the mobility signaling message prior to establishing route-optimization between the mobile node and the correspondent node.

16. The apparatus of claim 15, wherein the correspondent node has a home address and a care-of address and wherein the sending means sends the mobility signaling message to the care-of address of the correspondent node when the direct signaling mechanism is selected as the signaling mechanism.

17. The apparatus of claim 15, wherein the mobility message is a home test init (HoTi) message and wherein the sending means comprises:

for the indirect signaling mechanism:
means for tunneling the HoTi message to a home agent of the mobile node;
means for routing the HoTi message from the home agent to an other home agent of the mobile node; and
means for tunneling the HoTi message from the other home agent to the correspondent node; and for the direct signaling mechanism:
means for tunneling the HoTi message to the home agent of the mobile node; and
means for routing the HoTi message from the home agent directly to the correspondent node.

18. The apparatus of claim 15, wherein the mobility message is a care-of init (CoTi) message and wherein the sending means comprises:

for the indirect signaling mechanism: means for transmitting the CoTi message from the mobile node to a home agent of the correspondent node; and
means for tunneling the CoTi message from the home agent to the correspondent node; and for the direct signaling mechanism:
means for transmitting the CoTi message from the mobile node directly to the correspondent node.

19. The apparatus of claim 15, wherein the mobility message is a binding update (BU) message and wherein the sending means comprises:
for the indirect signaling mechanism:
means for transmitting the BU message from, the mobile node to a home agent of the correspondent node; and
means for tunneling the BU message from the home agent to the correspondent node; and
for the direct signaling mechanism:
means for transmitting the BU message from the mobile node directly to the correspondent node.

20. A non-transitory, tangible computer readable storage medium with an executable program stored thereon, wherein the program instructs a computer to perform a mobility signaling method according to claim 1.

21. The non-transitory, tangible computer readable storage medium with an executable program stored thereon of claim 20, wherein the correspondent node has a home address and a care-of address and wherein the sending step comprises the step of sending the mobility signaling message to the care-of address of the correspondent node when the direct signaling mechanism is selected as the signaling mechanism.

22. The non-transitory, tangible computer readable storage medium with an executable program stored thereon of claim 20, wherein the mobility message is a home test init (HoTi) message and wherein the sending step comprises the steps of:
for the indirect signaling mechanism:
tunneling the HoTi message to a home agent of the mobile node;
routing the HoTi message from the home agent to an other home agent of the mobile node; and
tunneling the HoTi message from the other home agent to the correspondent node; and
for the direct signaling mechanism:
tunneling the HoTi message to the home agent of the mobile node; and
routing the HoTi message from the home agent directly to the correspondent node.

23. The non-transitory, tangible computer readable storage medium with an executable program stored thereon of claim 20, wherein the mobility message is a care-of init (CoTi) message and wherein the sending step comprises the steps of:
for the indirect signaling mechanism:
transmitting the CoTi message from the mobile node to a home agent of the correspondent node; and
tunneling the CoTi message from the home agent to the correspondent node; and
for the direct signaling mechanism:
transmitting the CoTi message from the mobile node directly to the correspondent node.

24. The non-transitory, tangible computer readable storage medium with an executable program stored thereon of claim 20, wherein the mobility message is a binding update (BU) message and wherein the sending step comprises the steps of:
for the indirect signaling mechanism:
transmitting the BU message from the mobile node to a home agent of the correspondent node; and
tunneling the BU message from the home agent to the correspondent node; and
for the direct signaling mechanism:
transmitting the BU message from the mobile node directly to the correspondent node.

* * * * *